US010032478B2

(12) United States Patent
Cave, Jr. et al.

(10) Patent No.: US 10,032,478 B2
(45) Date of Patent: *Jul. 24, 2018

(54) VIDEO REPLAY SYSTEMS AND METHODS (71) Applicant: NFL Enterprises LLC, New York, NY (US)

(72) Inventors: John Edward Cave, Jr., Hillsborough, NJ (US); Arvin Z. Chan, Berkeley, CA (US)

(73) Assignee: NFL Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,327

(22) Filed: Dec. 27, 2016

(65) Prior Publication Data

US 2017/0110150 A1 Apr. 20, 2017

Related U.S. Application Data (63) Continuation of application No. 14/330,937, filed on Jul. 14, 2014, now Pat. No. 9,564,172.

(51) Int. Cl.
*H04N 9/80* (2006.01)
*G11B 27/00* (2006.01)
(Continued)

(52) U.S. Cl.
CPC .......... *G11B 27/005* (2013.01); *G11B 27/105* (2013.01); *G11B 27/11* (2013.01);
(Continued)

(58) Field of Classification Search
CPC ..... G11B 27/005; G11B 27/106; G11B 27/11; G11B 2220/61; G11B 2220/65; H04N 5/783
(Continued)

(56) References Cited

U.S. PATENT DOCUMENTS 5,719,988 A 2/1998 Blecksmith
6,699,127 B1 3/2004 Lobb et al.
(Continued)

FOREIGN PATENT DOCUMENTS

EP 1887575 A1 2/2008
WO 0060500 A1 10/2000

OTHER PUBLICATIONS

International Search Report dated Dec. 8, 2015.
(Continued)

*Primary Examiner* — Robert Chevalier
(74) *Attorney, Agent, or Firm* — Vinson & Elkins LLP (57) ABSTRACT A video replay system which allows for the playback of video files from a buffer in random access memory and from disk to minimize the delay between capturing and replaying a desired video portion. In one embodiment, a portion of RAM is allocated to provide a buffer for holding video files in memory before the files are written to a hard drive or other non-volatile storage. An index of key frames is also stored in the buffer. The computer system executes software that is responsive to an operator's commands to read the video files and index and playback desired video portions in a variety of modes and speeds, including slow motion, reverse, fast-forward, and slow or fast reverse.

23 Claims, 4 Drawing Sheets (51) Int. Cl.
*H04N 5/783* (2006.01)
*G11B 27/10* (2006.01)
*G11B 27/11* (2006.01)
*H04N 9/87* (2006.01)

(52) U.S. Cl.
CPC ............... *H04N 5/783* (2013.01); *H04N 9/87* (2013.01); *G11B 2220/61* (2013.01); *G11B 2220/65* (2013.01)

(58) Field of Classification Search
USPC ........ 386/248, 241, 343, 345, 347, 351, 350
See application file for complete search history.

(56) References Cited

U.S. PATENT DOCUMENTS

| | | |
|---|---|---|
| 7,734,153 B1 | 6/2010 | Park |
| 7,958,497 B1 | 6/2011 | Lindo |
| 2007/0157268 A1 | 5/2007 | Girish |
| 2010/0195978 A1 | 8/2010 | Ekchian et al. |
| 2011/0081075 A1* | 4/2011 | Adcock .............. G06K 9/00751 382/165 |
| 2012/0173753 A1 | 7/2012 | Moorthy |
| 2013/0010188 A1 | 1/2013 | Washino |
| 2013/0336627 A1 | 12/2013 | Calvert |

OTHER PUBLICATIONS

NFL RedZone Highlights—Technical Guide dated Sep. 11, 2010.
NFL Vision—Technical Guide dated Jun. 13, 2013.
Injury Video Review System—General Session.
Injury Video Review System—Hardware.
NFL Vision—User Guide dated Jun. 13, 2013.
NFL Injury Video Review System—Backup System.
NFL Injury Video Review System—System Operation.
NFL Vision DVR—Injury Video Review Technical Guide dated Jul. 10, 2012.
NFL RedZone Highlights—User Guide dated Jul. 25, 2011.
Extended European Search Report dated Jun. 15, 2017.

* cited by examiner

VIDEO REPLAY SYSTEMS AND METHODS

CROSS-REFERENCE TO RELATED APPLICATIONS

This application is a continuation of and claims the benefit of U.S. patent application Ser. No. 14/330,937, filed on Jul. 14, 2014, which is hereby incorporated by reference herein.

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The present invention relates generally to systems and methods useful in connection with the quick replay of data captured during events, and more particularly to the quick video replay of events such as may occur during a professional sporting contest, such as professional football or the like, including for example the playback of video of an event in a reverse mode.

2. Background of the Invention

Just about everyone who has watched professional sports in recent years has seen a game stopped for a "video replay," such as a stoppage of game play when one or more of the game officials will watch one or more monitors to see a replay of a play or event that recently occurred. Such replays may be to check on official rulings as to whether a player was in bounds or out of bounds when something happened (e.g., a catch, a fumble, a tackle, etc.), whether a player had possession of a ball at a certain moment in time or location on a playing field, whether a play was completed in time, and so forth. Typically, such replays have been of video or audiovisual footage taken during game play.

Conventional video systems allow for digitally recording and storing video images of a game during play. For example, there are a number of digital video cameras that are conventional, there are a number of digital video and audio-visual file formats in conventional use, and so forth. In conventional video storage and retrieval systems, it is typical to write the digital video files to a hard drive or disk. In such systems, when a video replay is desired, it is conventional to retrieve the desired video footage by reading it from the hard drive and then playing the same. In conventional systems, this often adds at least several seconds of delay to the replay; often as much as nine or ten additional seconds or possibly even longer. While this may not seem like a great delay, this additional nine or ten seconds is in addition to conventional delays caused by system constraints for recording, transmitting, and broadcasting the video signals, which themselves often result in a nine or ten second delay from when the event actually happens to when it can be played in replay. These delays may vary somewhat depending on the equipment and transmission systems involved and the bit rates involved, and may be shorter or longer in some systems. Moreover, conventional systems and methods for replaying video quickly in reverse-action mode by reading the video file from hard drive often do not provide a smooth and clear video image, but instead often provide choppy and sometimes poor image quality.

With conventional computer systems for video capture and playback, as noted above, there is often a significant delay between when the recorded event occurs and when it can be played back in replay. On a computer system, after the video is read from an external source it is typically first written to disk and then read back for playback.

In most conventional computer systems, the operating system (OS) utilizes buffers for temporary storage and assistance with file input and output (IO) operations in order to increase performance. In the case of storage on disks, a conventional operating system will usually, rather than writing data immediately to the disk, write the data to a buffer first and then later push the data to the disk when the disk is ready for writing. This approach typically enables better system performance. The software application making the write operation will not block access while waiting for disk to complete the write with this approach. Thus, this allows the system to continue processing data and also to write the video data to the buffer without blocking or requiring the write operation to first flush the data to disk. The use of conventional write buffers allow the operating system to continue processing data and write the data when the disk is ready.

Disabling the use of a write buffer usually leads to application performance degradation. When data is written directly to the disk without the data being stored in an intermediary write buffer, the software application usually blocks access while waiting for the disk to complete the write operation. This delay is often so large that incoming video data often can be dropped and permanently lost, as the application does not have enough time to read the new data. Further, conventional disks may have their own on-board cache. So even though a disk may report a write as complete, the data may still be in the disk's cache and not actually stored on the disk in non-volatile form.

One consequence of writing incoming data to a conventional write buffer is that data written into the write buffer is not immediately available for reading. Even though the operating system indicates the write operation has completed, the data will not be available for reading until the data has been flushed to disk. Although read operations in such situations do not necessarily fail, they nonetheless often return invalid or corrupt data if they reach the end of the disk file and try to read data still in the buffer. In the Windows operating system available from Microsoft Corporation, for example, the video data file's length will be updated even though the data file has not yet been flushed to disk. An attempt to read the latest data from disk in this situation results in a return of invalid data (e.g., all 0's). One approach to deal with this problem is to ensure that the read operation for the data to be played back does not read too closely to the end of the file. Otherwise, the system risks reading data that is present in the write buffer but not yet written to the disk. For highly compressed video data streams, keeping the read operation a few megabytes behind the end of the file will result in a delay of at least a few seconds behind the video data stream in conventional systems. It is believed that as video compression continues to improve, this latency will increase. For example, with conventional AVC/H.264 coding, the delay could get as long as 10 seconds, and perhaps longer depending on, for example, the bit rate of transmission.

Besides avoiding increased delay or latency, as well as corrupted or incomplete file storage, there are additional important considerations for live event analysis via video playback. For example, the ability to seek to certain points in time and to provide so-called "trick" play video playback with full reverse playback capabilities can be important. "Trick" play usually refers to the system's ability to play video at rates other than the normal 1× rate, including playback of the video in slow motion, fast forward, and reverse motion (slow and fast) modes.

In conventional video capture and storage systems and methods, key frames are often used. Key frames are fully encoded pictures. To achieve high compression ratios, inter-frame video codecs will often encode data for one full picture, a key frame, and store only the delta information for subsequent pictures. For example, if picture 1 is encoded as a key frame, picture 2 is stored as the differences between picture 1 and 2. Picture 3 is stored as the differences between picture 2 and 3, and so on. In systems using this approach, if one wishes to replay picture 3, the system must first decode pictures 1 and 2 before it can decode picture 3. Another alternative conventional approach involves intra-frame compression schemes in which every picture is stored as a full picture and is itself a key frame.

Key frames are sometimes referred to as I-frames. In addition to the key frames in a compressed video data file, a group of pictures (GOP) usually includes either or both of P-frames and B-frames. A P-frame (sometimes referred to as a predicted picture) is used to generate an image by using a prediction made from an earlier image, usually a key frame (or I-frame), although a P-frame can also be based on one or more earlier P-frames. Thus, a P-frame need only store or reflect the difference between the key-frame and the image to be generated from the P-frame.

A B-frame (sometimes referred to as a bidirectionally predicted picture or image) is a frame in which the image is predicted or interpolated from earlier and/or later frames. As noted, the I-, P-, and B-frames can be organized as a group of pictures (GOP). A GOP pattern can be considered long or short. Typically, a long-GOP pattern includes several P- and B-frames between each I-frame. A variety of video data compression formats have been published as standards, including the H.264 format, first published by International Telecommunication Union (ITU) in 2003 or so as ITU-T H.264, "Advanced video coding for generic audiovisual services," which is hereby incorporated by reference as if fully set forth here.

In addition to inter-frame compression techniques for audiovisual data files, it is conventional to use intra-frame compression techniques as a possible alternative. Intra-frame compression techniques are used to create stand-alone frames (sometimes called I-frames). (P- and B-frames are not stand-alone frames.) Generally, intra-frame compression involves coding an image or frame with fewer bits than the original, such as for areas of similar color or texture.

In conventional video capture and storage systems a key image index was created and this index was shared with the reading process through disk. This approach resulted in the inability of the playback system to provide reduced time delays. In addition, the index had to always match the available data. To guard against video data still being in the write buffer, the index had to take a conservative approach and report a shorter file duration to prevent the application from reading too close to the end of the file. This resulted in an overall degradation in performance of the video playback, especially in situations requiring quick analysis of live events. A noticeable delay of even a few additional seconds during a televised broadcast of a game watched by millions of people is undesirable for a number of reasons. Moreover, for video data in formats using a long-GOP approach, providing a video playback in reverse mode quickly and with an acceptable quality is extremely difficult due to the encoding and compression algorithms and the resulting decoding needed for such video files.

A system for the replay of recordings of live events is described in U.S. Published Patent Application No. 2010/0195978 A1, published on Aug. 5, 2010. This application describes the use of instant replay in connection with the officiating in sports events, including NFL football games. This application also describes several shortcomings with conventional systems, including the labor intensive nature of the video replay process and the need for quickly providing such replays. Published U.S. Patent Application No. 2010/0195978 A1 is hereby incorporated by reference as if fully set forth herein.

A system using key frames to allow video replays of computer game action is described in U.S. Pat. No. 6,699,127 B1, issued on Mar. 2, 2004 to Lobb et al. This patent describes a system in which a video game user may choose to replay a portion of the game and in response to user's command the system "rewinds" the game by three seconds and the game replay begins from the key frame nearest the point three seconds earlier. The patent also describes the use of a wrapper buffer to store each key frame generated during the course of the game. U.S. Pat. No. 6,699,127 B1 is hereby incorporated by reference as if fully set forth herein.

SUMMARY OF THE INVENTION

The present disclosure addresses embodiments of certain systems, apparatus, and methods that can be useful in connection with a video replay system which allows for the playback of video files from a buffer in random access memory and from disk in a manner which minimizes the delay between capturing and replaying a desired video portion. In one embodiment, a portion of RAM in a computer system is allocated to provide a buffer for holding video files in memory before the files are written to a hard drive or other non-volatile storage, and an index of key frames is also stored in the buffer. The computer system also executes software that is responsive to an operator's commands to read the video files and index and playback at least one portion of a video as desired, and the playback can be provided in a variety of modes and speeds, including slow motion, reverse, fast-forward, and slow or fast reverse.

In one particular embodiment, a system for providing a video playback of an event is disclosed, with the system comprising a computer having a processor operable to receive a plurality of video data inputs each of an event and connected to a non-volatile storage and a memory buffer, wherein at least a portion of the memory buffer has been allocated for storing video data and information related to the video data, and wherein at least a portion of the memory buffer is restricted so that the portion cannot be the subject of both a read operation and a write operation at the same time, as well as software operable on the computer to receive the video data inputs and generate a key frame index and store at least a portion of the video data and at least a portion of the index in data blocks in memory, and store at least a portion of the video data and at least a portion of the index in non-volatile storage; a controller connected to said computer; a display connected to said computer; software operable on the computer and responsive to a command from said controller to generate a playback of at least a portion of the video data for an event, and to check the key frame index and determine whether the portion of the video data responsive to the operator command is stored in non-volatile storage or memory and to read the video data from either the non-volatile store or from memory in response to the check of the key frame index, and generate a display of the playback of the portion of the video data in a reverse mode in response to a command therefor from said controller. In this and other embodiments, the system may comprise a plurality of controllers and/or a plurality of corresponding video displays, software operable to generate a display of the playback of the portion of the video data in either or both slow motion and/or fast motion modes. In one particular embodiment, the system may have the portion of the memory buffer allocated for storing video data comprising at least between 5 megabytes and 75 megabytes of RAM, between at least 30 megabytes and 50 megabytes of RAM, between 35 megabytes and 50 megabytes of RAM, and/or about 40 to 45 megabytes of RAM.

In another particular embodiment of the present disclosure, a method of providing a video replay of an event is provided that comprises the steps of: recording an event in a video file, storing the video file in volatile memory, generating an index of at least a plurality of key frames of the video file, storing the index of key frames in volatile memory, upon an operator command, reading at least a portion of the index and the video file from volatile memory, and displaying at least a portion of the video file. In one embodiment, the volatile memory is a buffer which comprises a portion of random access memory in a computer system. In another embodiment, a method can further comprise the steps of allocating a portion of volatile memory for storage of the index of key frames and the video file, restricting access to at least a portion of the portion of volatile memory allocated for storage of the index of key frames and the video file, and/or storing the index of key frames and the video file in non-volatile memory. In another embodiment, a method can include the step of providing a controller operable to select a mode of displaying the video file and to control the mode, wherein at least one such mode is the display of a portion of a video file in a reverse mode. The method can further include an embodiment in which the controller is operable to allow an operator to display the video file in a fast-forward and/or fast-reverse modes, and/or slow-forward and/or slow-reverse modes of display. In addition, the method may include the additional steps of storing a portion of the video file in non-volatile memory, responsive to an operator command, if a portion of the video file to be read in response to the command is stored in non-volatile memory, reading the portion of the video file stored in non-volatile memory, and displaying the portion of the video file stored in non-volatile memory.

In yet another embodiment of the present disclosure, a computer system useful for providing a video playback of an event is provided, with the computer system comprising a computer having a processor operable to receive a plurality of video data inputs and connected to a non-volatile storage and a memory, wherein at least a portion of the memory has been allocated for storing video data, software operable on the computer to receive the video data inputs and generate a key frame index and store the video data and the index in data blocks in memory, software operable on the computer to store the video data and the index in non-volatile storage, and software operable on the computer and responsive to a command from an operator to generate a playback of at least a portion of the video data for an event, and software operable to generate a display of the playback of the portion of the video data in a manner responsive to a mode selected by an operator using a controller. In one embodiment, the system includes a buffer in RAM in the computer system. In another embodiment, the video data comprises an index of key frames and a corresponding video file, and/or at least a portion of the portion of volatile memory allocated for storage of the index of key frames and the video file is restricted so that the portion cannot be the subject of both a read operation and a write operation at the same time. In another embodiment, the system further comprises a plurality of video displays and a corresponding plurality of controllers, wherein each of the controllers is operable to control the mode of a video display shown on the corresponding video display. The system in another embodiment may further comprise software operable on the computer to check the key frame index and determine whether the portion of the video data responsive to the operator command is stored in non-volatile storage or memory and to read the video data from either the non-volatile store or from memory in response to the check of the key frame index.

In still another embodiment of the present disclosure, an apparatus which is a computer-readable storage medium is provided, with the medium having stored thereon one or more computer software programs with instructions which, when executed by a computer system, will perform the steps of recording an event in a video file, storing the video file in volatile memory, generating an index of a plurality of key frames of the video file, storing the index of key frames in volatile memory, upon an operator command, reading at least a portion of the index and the video file from volatile memory, and displaying at least a portion of the video file. Those skilled in the art will appreciate that such computer-readable storage media may comprise any one of a number of types of storage media, such as CDs, DVDs, floppy disks, memory cards, memory sticks, jump drives, hard drives (whether mechanical, solid state, NAND flash, NOR flash, or a combination of some or all of the foregoing), and similar types of storage media, which may be internal or external.

DETAILED DESCRIPTION OF THE PREFERRED EMBODIMENT

During many events, including sports events, it is typical for a number of video cameras to capture the event from a variety of vantage points. The following detailed description uses a professional sporting event, such as a professional football game like those played by teams in the National Football League ("NFL"), as an example only. Those skilled in the art will appreciate that the embodiments described herein will find useful application in a variety of situations beyond professional or amateur sports. As described above, it is useful to provide for video playback of a variety of events which occur during a sporting event, such as for example an NFL game. Although this disclosure generally uses the term "video" to describe the type of data and displays involved, those skilled in the art will understand that the term "video" should be understood to include any display of moving pictures in which a succession of still images is displayed to convey a sense of motion to a human observer. In addition, the term "video" should be understood to include video and/or audiovisual data. Finally, those skilled in the art will appreciate that the systems and methods disclosed herein can be useful with respect to other types of data, such as audio-only data, still images, and the like, for example.

Figure 1:
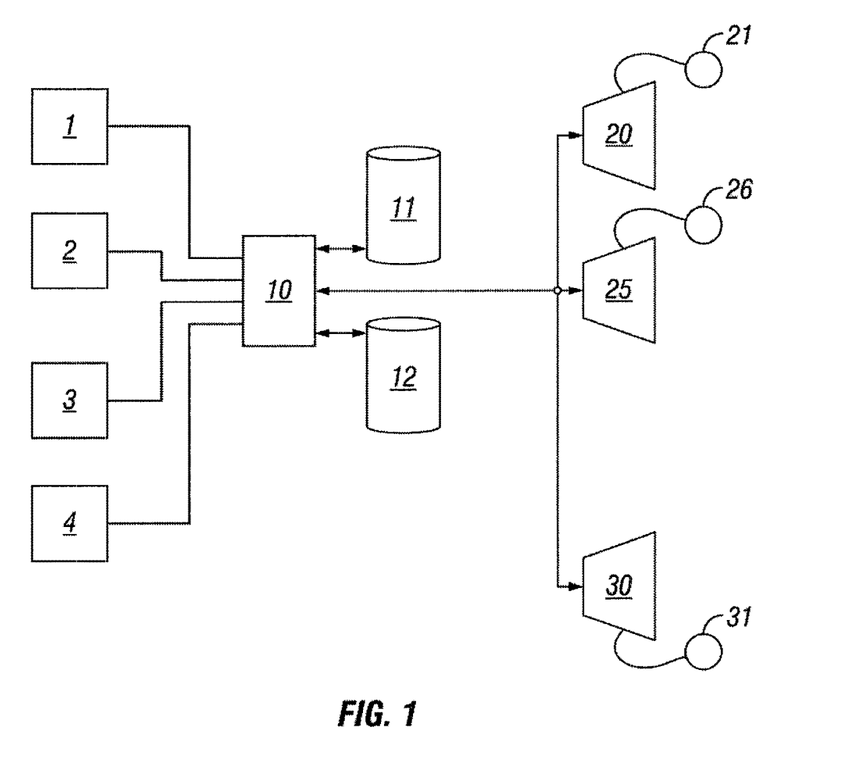
FIG. 1 is a schematic diagram of one embodiment of the present disclosure.

Referring now to FIG. 1, a schematic diagram of one embodiment is shown. In FIG. 1, a number of different cameras 1, 2, 3, and 4 may be used to capture video, audiovisual, and/or still images of an event, or may be devices to capture audio of an event. For purposes of this disclosure, a professional football game is used as the primary example of the event, or may be devices to capture audio. It will be understood that a typical football game itself comprises many events, including various plays, first downs, touchdowns, interceptions, completions, fumbles, recoveries, punts, and the like, many of which have a number of attributes, such as yards gained or lost, the time at which they occurred during the game, etc. In addition, the events may include penalties, such as for offside, illegal motion, pass interference, and the like. Those skilled in the art will appreciate the use of and need for officials to make officiating calls during the course of such a game, such as whether a passing play resulted in a completion, an incomplete pass, or an interception, for example.

As shown in FIG. 1, each of cameras 1-4 is connected to a computer system 10. Each of the cameras 1-4 may be any one of a number of different types of conventional cameras. While a digital signal should be provided to the computer 10, an analog output from any one of cameras 1-4 can be converted by an analog-to-digital converter (not shown). Thus, cameras 1-4 may be digital or analog. Those skilled in the art will also appreciate that although each of cameras 1-4 is shown as connected to computer 10 by a wired connection, any or all of cameras 1-4 may be connected to the computer 10 via wireless connection, such as by WiFi, cellular, or other wireless connection or network. Similarly, those skilled in the art will appreciate that many more than just four cameras may be used, or even less than four cameras may be used, to capture footage of an event such as an NFL game.

Still referring to FIG. 1, computer system 10 is connected to (or may contain) memory 11 and disk 12. In this embodiment, memory 11 comprises a volatile memory storage, such as random access memory. Disk 12 comprises non-volatile memory, such as a hard drive (which may be mechanical or a solid state flash drive). Those skilled in the art will appreciate that computer 10 comprises one or more processors which execute instructions contained in one or more computer programs running on the computer 10, which may include both the operating system and one or more application programs. The operation of computer 10 and memory 11 and disk 12 are described in more detail below. Computer 10 may be a conventional personal computer. Those skilled in the art will further appreciate that, although a single computer 10 is shown in FIG. 10, multiple computers or servers (not shown in FIG. 1) may be used, and such computers or servers may be located in multiple locations that are physically remote from one another and/or the event.

Also connected to computer 10 in FIG. 1 are three video display units 20, 25, and 30. Each of video displays 20, 25, and 30 may have a corresponding controller 21, 26, and 31 connected to it. In one embodiment, a video display 20 and its controller 21 are located on or near a home team's sideline during a game, while a video display 25 and its controller 26 are located on or near the visiting team's sideline during a game. In addition, the video display 30 and its controller 31 are located near the playing field for use by officials during the game. Alternatively, the video display 30 and controller 31 can be located at a location remote from the playing field, such as in a broadcast or control booth or other room located in the same football stadium, for example, or can be located at some other remote location from the event if desired.

In one embodiment, each of the video displays 20, 25, and 30 is independently able to retrieve and playback at least a portion of a video capture of an event in response to a command from an operator using one of the corresponding controllers 21, 26, and/or 31. In this embodiment, the video displays 20 and 25 are provided near the teams' sidelines so that, if a potential injury-causing event is detected, a video playback of that event is quickly available for review by a team's doctor, trainers, or other medical staff. For example, if a home team's running back is tackled during a play, and gets up limping at first, an operator can tag the video data for the preceding play as related to a potential injury and, if one or more medical staff members of the home team wishes to see the event that resulted in a potential injury, those staff members can use the controller 21 to playback video of the event. Moreover, the controller 21 can be used to playback the event in reverse action or backwards, in slow motion, fast forward, fast reverse, or essentially backwards or forwards at whatever speed the operator chooses. This video playback can be used by the medical staff to quickly pinpoint the likely type and location of an injury.

Besides the two display units 20 and 25 for the two teams and their medical staff, FIG. 1 shows the provision of a video display unit 30 and a corresponding controller 31 for use by game officials. As with the video displays 20 and 25, and controllers 21 and 26, respectively, described above, an official can use the controller 31 to control a video playback shown on the display 30. The controller 31 allows the operator to play back a portion of the video of an event in reverse, slow motion, fast forward, and essentially backwards or forwards at various speeds. In addition, the controller 31 may allow the official to advance the images shown on the display 30 on a frame-by-frame basis (either forwards or backwards). Those skilled in the art will appreciate that various types of equipment may be used; video display units 20, 25 and 30 may be any one or more of a variety of conventional personal computers, such as laptop computers or tablet computing devices. Controllers 21, 26, and 31 may be of any one of a variety of different controllers, but we have found that the controllers provided by Microsoft Corporation of Redmond, Wash., as controllers for its Xbox video game apparatus are useful.

Those skilled in the art will appreciate that more or less video displays than the three displays 20, 25, and 30 shown in FIG. 1 may be provided. In addition, those skilled in the art will appreciate that each of the displays 20, 25, and 30 may be connected to more than one controller (not shown in FIG. 1), each of which can be used by an operator to control the display shown. In such situations, it may be advantageous to provide different types of controllers connected to a single video display unit, as different people may use the video display during the course of the game and may be more comfortable and better able to use a given type of controller than another person, who in turn may prefer to use a different type of controller.

One way to improve access to real-time video data is to cache the most recent video data in faster memory. This approach eliminates the need to limit the playback process from reading too close to the end of the file on disk when the video data has been stored on a disk. In one embodiment the most recent video data and index information is stored in shared main memory, often known as RAM (for random access memory), a type of volatile memory. Accessing main memory for both reads and writes provides much faster response times than reading and writing the video and index data from the disk. For fault tolerance, we prefer to separate the capture and playback into separate processes. This approach allows capture of the video data to continue independently of the playback process.

A potential problem with shared memory, especially across multiple threads and processes running at the same time, is maintaining a consistent view of the data. Different processors and compilers may reorder data reads and writes. This potential re-ordering of read and write operations can become an issue when multiple threads and/or processes access the same data, especially on multicore processors.

In order to ensure data coherency, memory fences (or memory barriers) may be used that ensure read and write operations to main memory finish within the memory fence instructions. Operating systems may expose these memory fences through synchronization primitives, such as semaphores, mutexes, and locks. Programming languages can expose such functionality through marking variables with key words such as volatile. However, overuse of synchronization primitives can lead to performance degradation as the capture and playback process can block each other from accessing the data. Generally, it is helpful to allow multiple threads (processes or programs) to read the same data from memory at the same time, but such memory fences or barriers may be used, for example, to prevent a given program (or thread or process) from reading a block of data in memory which is currently the subject of a write operation or is otherwise protected.

Although modern computer systems can have hundreds of gigabytes of main memory, the required shared memory buffer to be allocated for systems and methods as disclosed herein can be relatively small. For example, in a computer system implementing one embodiment, we allocated at least 42 MB (megabytes) of the system's RAM memory to serve as a buffer for the recent video data and index data. This allocation can be relatively limited because, as a practical matter, for most video playback situations, only the most recent nine to ten seconds or so of video data generally need to be shared and accessible from memory, and the remainder of the video data and index data can be stored and accessible from disk without causing undue delays in the playback.

The amount of memory to be allocated as the buffer can be based on the video data packet size multiplied by a minimum RAM allocation size (such as 64 kilobytes). Video data packet sizes can be a multiple of 188 or 192 bytes for Mpeg transport streams or Blu-Ray Mpeg-2 transport streams, for example. We have found that it is helpful to allocate the buffer memory so that it is at least a given multiple of the packet size for the video data to be received and copied into the buffer memory. The memory buffer in RAM can be allocated via a call to an operating system process to allocate the shared memory in RAM. The operating system (such as Windows, which is available from Microsoft Corporation of Redmond, Wash.) will allocate the shared memory. Application software can be used to divide the allocated memory into smaller blocks. In addition, the operating system will share the relevant information regarding the allocated memory in RAM and the blocks, such as the block size and block count of the memory, the number of the low memory block in use, and the like.

While there are a number of different methods by which the size of the allocated memory and the data blocks within the allocated memory can be determined, an example used within a preferred embodiment is described herein. An incoming data packet can be composed of 7 transport stream packets, each containing 188 bytes, such as with an Ethernet transport stream, for example. This allows the data packets to be around 1316 bytes in size. Presently, operating systems are capable of allocating at least 64 KB (or 65,536 bytes) of memory in RAM, but may not be able to allocate memory in smaller amounts. This can be considered the system's memory allocation granularity. To determine an appropriate size for a RAM buffer using 1316-byte data packets, the system allocation granularity (64 KB) can be multiplied by a mathematical factor of the data packet size (1316 bytes). This mathematical factor can be the lowest whole number value that results from dividing the data packet size by a power of 2. For example, dividing the data packet size (1316) by a 4 results in 329, a whole number. Dividing 1316 by higher powers of 2 (e.g., 16) would not result in a whole number. Therefore, 329 is an appropriate mathematical factor for these purposes.

Once the system allocation granularity (e.g., 65536 bytes) is multiplied by the factor (e.g., 329), an appropriate allocation for a RAM buffer can be determined. In this example, using a 1316-byte data packet size, a block size of 21,056 KB (or 21,561,344 bytes) can be sufficient. In certain situations, however, it may be desired to increase the block size. A decreased RAM buffer size may also be desired in certain situations. Once a RAM buffer size has been determined, the number of blocks within the RAM buffer and block size can be determined. While there are multiple methods of calculating the number of blocks, one of these divides the RAM buffer size by the size of the data packet. Lower or higher numbers of blocks may be desired, depending on factors such as system architecture, memory buffer size, the amount of playback delay that is acceptable, and the like. Similarly, an appropriate size for each block in RAM may be calculated by dividing the RAM buffer size by the number of blocks.

For the example of an Ethernet transport stream with a packet size of 188 bytes, and a message transmission unit (MTU) of 1500 bytes, the system can send 1316-byte transport stream packets (i.e., 7×188). With an allocation of 42 megabytes for the memory buffer, which we have determined provides good results, for example, this will result in 2048 blocks each with a size of 21,056 bytes. This approach uses a factor of 329 (e.g., 1316÷4), an allocation target of 42 MB for the RAM buffer, and an operating system allocation granularity of 64 KB, resulting in a block count of 2048 (e.g., 2×329×64 KB=41.125 MB, with 41.125 MB (43,122, 688÷1316÷16=2048)), each with a block size of 21,056 bytes (e.g., 43,122,688÷2048=21,056). Those skilled in the art will appreciate that different video formats and transmission modes will involve different packet sizes and so the desirable amount of memory to be allocated and the desired block sizes and numbers may vary as desired. We have found it advantageous to use smaller block sizes and higher block counts because this can provide availability of the video data more quickly, so the playback of the video data can be done much closer in time to the live event.

Figure 2:
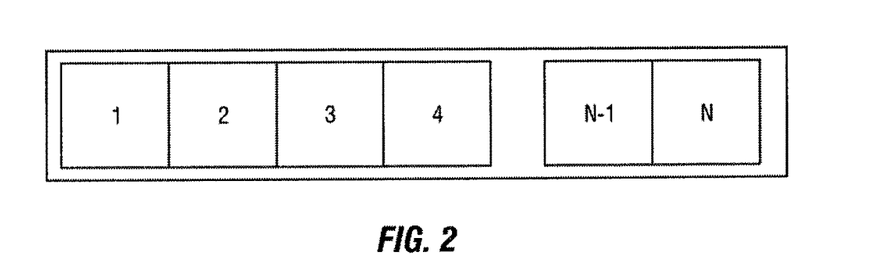
FIG. 2 is a block diagram representing the allocation of blocks of memory in a memory buffer in one embodiment.

The shared memory buffer can be divided into smaller blocks. Block sizes in this embodiment are based on the input data packet size. Those skilled in the art will realize that the block size may be larger or smaller as may be desired. As video of the event is captured and read, the older video data is cleared from the buffer to make space for the newer video data. In one embodiment, a first in first out (FIFO) circular buffer is used. Referring now to FIG. 2, a diagram representing a circular memory buffer is provided. In one embodiment, data is first written into block 1, then block 2, then block 3, and so forth. Once data is written in to block N, the buffer wraps around and the data in block 1 is erased to make room for new data.

One advantage of this approach is that the data is contiguous between blocks except for the edge case, when the last or highest memory block is used and the data is then written next into the lowest or first memory block. An alternative scheme could utilize random ordering of blocks. Using contiguous blocks makes reading the video data from the buffer much easier and quicker. In addition, all video data is available from the low block address to the high block address, thus making playback more efficient.

Figure 3:
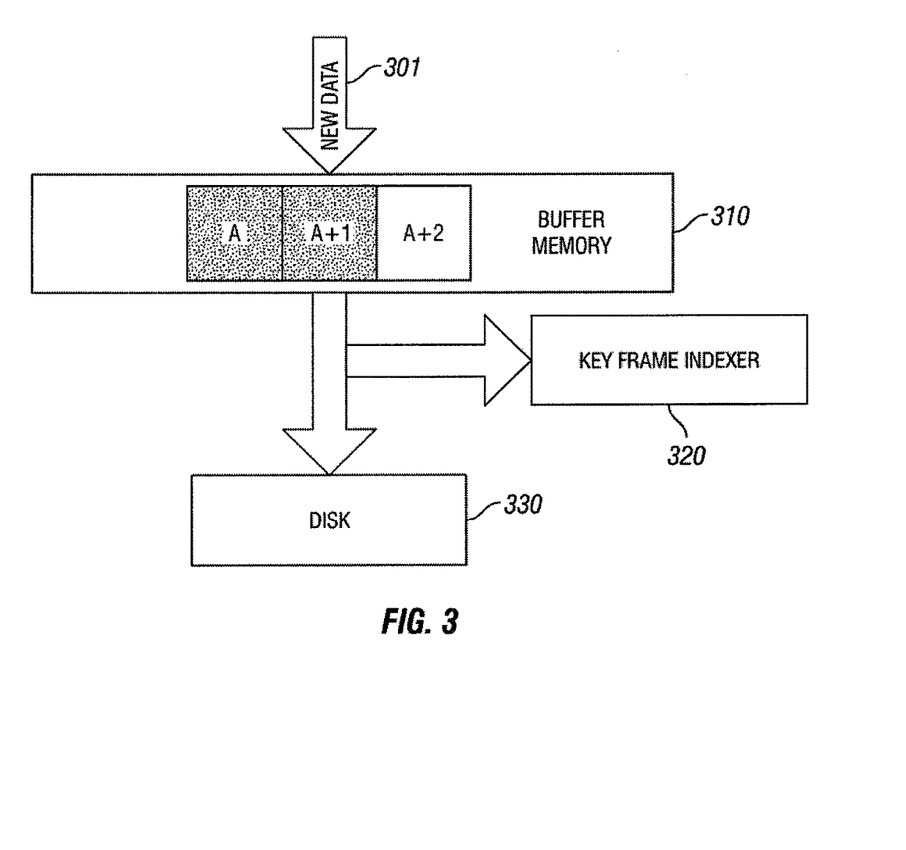
FIG. 3 is a block diagram representing the storage of new data blocks in a memory buffer, the parsing of same and the storage of same to a disk in one embodiment.

The data in the buffer that can be shared includes the video stream data, the block count, block size, buffer address, first data block, available data count, and index information such as key frame positions, key frame numbers, and total frame count. When the capture process receives data, the system copies the data to the shared buffer. The system then updates the available data count and if a data block was freed, it also updates the first data block. As shown in FIG. 3, the system is programmed so that when a new data block 301 is written to the buffer memory 310, the new data 301 is parsed by the key frame indexer 320 and also written to disk 330. When a new key frame is found during the parsing, the system updates the index information as well. The indexer 320 can also generate an index of all frames, not just the key frames. The index so generated is stored first in memory 310 before being written to disk. Moreover, the video data is passed to the indexer 320 before being written to disk in this embodiment.

In one embodiment, two separate threads are used during the video capture and storage in the buffer. The first thread reads the video data from the video input source and writes the video data to the shared memory buffer. This first thread also checks whether the key frame indexer has detected any new key frames and writes the result of that check to the shared memory buffer as well. The second thread reads video data from the shared memory buffer and then passes it to the key frame indexer and also writes the video data to disk. The key frame indexer can be provided by a separate program and run on its own thread, as opposed to being part of the software program which performs the video read or write operations. This architecture ensures that only one thread ever writes data to the shared memory buffer, and the other threads and processes only read from the memory buffer.

In order to minimize the amount of shared data in the memory buffer that is locked, a synchronization object is used to restrict access to the shared variables. The synchronization object also acts as a memory fence guaranteeing that the data is coherent. Whenever the capture process updates or the playback process reads the first data block, available data count, and index information, they must first attain the lock.

Figure 4:
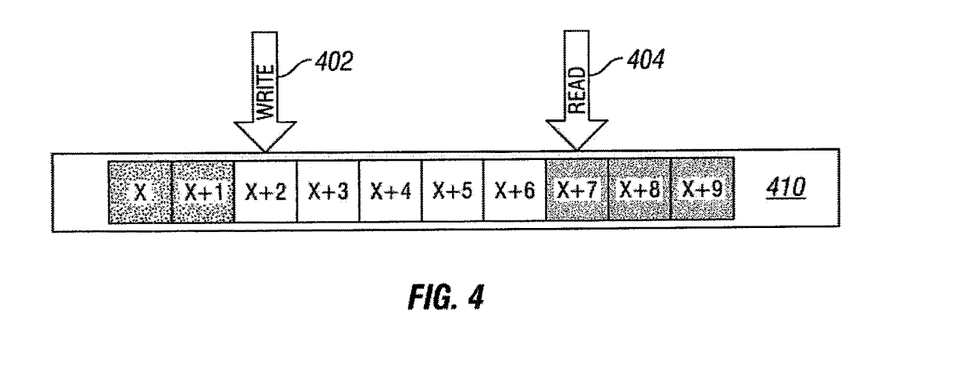
FIG. 4 is a block diagram illustrating the gap between memory blocks in a memory buffer that are the subject of write and read operations in one embodiment.

The shared video data in the memory buffer is not locked in this particular embodiment. Both the capture and playback process can access the shared buffer. However, the two processes should not access the same data block simultaneously. A couple of techniques can be used to achieve this. In one embodiment, a gap of blocks is left between the current write block and the first data block. The assumption is made that both processes can access main memory at the same rate. A diagram of this approach is shown in FIG. 4. In FIG. 4, new data block 402 is written to block x+2 in the memory buffer 410. At the same time as the new data block 402 is being written to the buffer 410, a read operation reads the data block 404 stored in block x+7 of the memory buffer. The gap in the memory buffer 410 between the blocks x+2 and x+7 thus helps avoid a situation in which the two processes (e.g., the read and write processes) attempt to access the data in the same block in the memory buffer 410.

With this approach, upon receiving new video data, the capture process first writes the new data 402 to the shared memory buffer 410 and then locks access to the shared variables before updating the first data block and available data count. This approach means that even if the capture process updates the first data block to block x but the playback process was reading block x+1, the data in block x+1 is still valid because of the gap. As long as the playback process checks the value of the first data block before accessing the shared video data, the system should not run into a situation where the data in the memory buffer 410 is overwritten. This approach also minimizes the need to lock large portions of memory in the memory buffer. In this approach, a new video data block 402 is completely written to the memory buffer 410 before the shared variables are updated. Further, as the available data count is updated after new data is written, the playback process will not read beyond the write head.

In one embodiment, the software is programmed so that, whenever the playback process goes to read captured video data it performs a check to see whether the requested data is in memory or already stored on disk. As described above, the previously executed capture process will have already stored older video data to disk. By accessing the shared memory for the most recent video data, the playback process is able to retrieve and display the requested video data much faster and so the video playback of an event can be much closer in time to the live occurrence of the event. To support reverse playback mode in this embodiment, the reverse playback is restricted up to the last key frame. This is to ensure that all frames are decodable. Allowing access past the last key frame can lead to decoder hangs if the video stream suddenly cuts off By keeping the key frame intervals under 30 frames, it has been found that the playback process can provide a playback video display within half to one second of the live event's occurrence.

The architecture described so far can support multiple playback processes simultaneously accessing the captured video data from the memory buffer. As the shared video buffer is not locked, all playback processes can read the same video data from the shared memory buffer. The only source of contention is access to the shared variables describing which blocks are in use in the memory buffer as they must be updated concurrently. Access to the key frame index itself need not be synchronized. However, access to the total count of key frame indexes is synchronized in this embodiment. As with the video data blocks, index information is first written into the buffer before the count is updated.

Those skilled in the art will appreciate that the systems and methods described so far will allow for the playback of the video files from both the memory buffer and also from disk. As previously described, an index of the frames is created as the video data is stored in memory and stored in disk. We have found that for systems in which the video data is received at about two to three megabytes per second, and with a memory buffer of at least 42 megabytes or so, the computer system is able to store the video data in disk without difficulties or loss of data. Because the frame index is created at essentially the same time as the video data is being written to disk, the frame index is available essentially immediately. As a result, the system is able to playback almost instantly the last several frames of video data stored in memory but not yet stored in disk and, once the frames in memory have been played back, switch to the appropriate next frame (and successive frames as may be desired) that have been stored in disk. Such a situation could occur, for example, during a reverse-mode playback or if the video playback had been paused and is then restarted by an operator. As noted above, we have found that the ability to playback the most recent nine to ten seconds of video data from memory is sufficient, with the remainder of the video data playback (if and as may be desired by an operator) coming from video data previously stored in disk. However, as desired, the allocation of memory can be configured to provide a longer, or shorter, segment of video stream for purposes of video playback, and can be anywhere from less than one megabyte to tens or hundreds of gigabytes. The system thus provides a seamless transition for playback of the video data from the memory and from disk.

In one particular embodiment, a number of distinct computer processes are used to record and read the video data. Referring back to FIG. 1, in this embodiment, video data in the form of a stream of data from each of video cameras 1-4 can be provided to a computer 10. The computer 10, as noted above, may be of a conventional type such as a personal computer like the model ThinkPad T430s laptop computer, which is commercially available from Lenovo Corporation. The computer 10 includes the Windows 7 Professional operating system, which is commercially available from Microsoft Corporation, and additional software programmed to execute on the processor of computer 10 and perform the functions and steps described herein. The software executing on computer 10 can be considered to include the background recording process, one or more foreground processes, and also a communication wrapper. In this embodiment, the background recording process is the process that does the actual recording of the video data, including the storing of the video data and the frame index in the shared memory buffer and the storing of the video data and the frame index in non-volatile storage or disk. The foreground processes can include those software programs that display the video data and may be used to respond to input commands from a user as to the display as described herein. Typically, each foreground process can use the communication wrapper (which can be an ActiveX control, for example, or the like in this embodiment) to issue commands to the background process. Windows named pipes may be utilized for two-way communications between the background process and the communication wrapper(s). Such pipes typically have user-defined names and message buffer sizes (such as 16 KB, for example). Similarly, Windows allows the user to create shared memory blocks with user-defined names, which can then be used by other processes to find and access (i.e., read and/or write from and to) the shared memory block.

When the background recording process in this embodiment begins execution on computer 10, it creates a shared memory block for a file which is used to store information on how to access a video data stream's shared video data. This file can be referred to as the Recording_Mapping_Structure. In addition, a file is used to store information about the video data such as the file length, IP address or QAM/OTA tuning values, and the like. This latter file structure (in this embodiment called the Active_Recording_Information) is used to communicate information with the communication wrapper(s). Another file structure (called the File_Share_Mapping_Information) is a mapping used to match video data file names to the corresponding shared memory block for same. In this embodiment, the recording process generates random share names to avoid conflicts between or among file names. In addition, a mutex is used to restrict access to the information in the structure Recording_Mappings, which includes a table or listing of the active recordings and their corresponding share names. The background process can record multiple video streams simultaneously. A mutex is therefore used and helpful to restrict access to the table of entries in the Recording_Mappings structure. If a program attempts to open a file that is currently being written, the program checks the table entry for the file it wishes to open to obtain read access. The mutex is used to further avoid conflicts. The video data streams in this embodiment can include any one or more of Internet Protocol television (IPTV), quadrature access modulation (QAM) (such as a cable system via a coaxial cable), and/or over-the-air using an antenna (OTA) video stream.

Once the background recording process is successfully connected to one or more video data streams in this embodiment, it creates two shared memory blocks. One of these memory blocks is for storing the raw video data, and the other is a file structure (called LiveDataShare) that is used to store all of the other information relevant to the raw video data, including for example, the corresponding raw video data buffer shared memory name, the size of the corresponding video memory buffer, the memory block count, the file offset of the corresponding video data in the shared memory, the size of available data in memory, the key frame index, and the like. In this embodiment, a mutex is also used to restrict access to these two memory blocks to avoid conflicting operations on the same shared memory files.

After these two memory blocks have been created, the background recording process in this embodiment updates the Recording_Mappings file structure with the relevant new information in the File_Share_Mapping_Information structure. The background recording process also enters a mapping for the video data recording file name to the shared memory structure LiveDataShare. In addition, the background recording process creates a file on disk for storing each captured video data stream. The file for the video data to be stored on disk is created with read only share permissions (which in this context means that the sharing of the file on disk is with other processes that are not reading from memory at this time).

As noted above, one or more foreground processes can execute or run on computer 10 at the same time as the background recording process is operating in this embodiment. A playback process can be used to provide a display of the video data being recorded from any one (or more, if desired) of cameras 1-4. Once the playback process determines that a video file is live (e.g., the background process is actively recording data), it can check to determine whether the video data is being shared in memory. This may not always be the case. For example, if the background recording process and the playback process are executing on different computers, the playback process may not be able to access the shared memory blocks with the video data. Those skilled in the art will appreciate that it is possible to share memory between or among multiple computers, but may choose not to do so.

When the playback process loads a video file in this embodiment, it will first attempt to access the Recording_Mappings file structure to determine if there is a corresponding File_Share_Mapping_Information entry. If one is found, then the playback process will map the specified LiveDataShare structure entry and the raw video data found in the memory buffer into its memory space. Each time the playback process requests data from the video data file, it will check the LiveDataShare structure first to determine whether the video data should be read from memory or from disk. A member variable in the LiveDataShare file can be used so that the value provides the offset from which file data is stored in memory. In addition, another variable in the LiveDataShare file can be used to provide a value for the amount of video data available in memory. One advantage of this embodiment is that, even if the background recording process crashes or hangs or otherwise ceases functioning, the playback process should not be affected. Once the playback process has mapped a shared memory space, the operating system on the computer 10 will retain the memory contents even if the creating process (e.g., the background recording process) has terminated or is non-responsive.

A situation may exist in which the recording process and the playback process are not stored or running on the same computer. In such a situation, the Recording_Mappings file structure will not be not found when called or requested as noted above. If this happens, for example, when the recording process is on one computer and the playback process is on another, the playback process will attempt to load the video data with file share read only permissions. If the video data file is actively being written to at this time (i.e., this file is an active video recording), then this call will fail. Since the recording process is writing data to the file it possesses write permissions. In order to load an active video data file that is recording, both the file share read and file share write permissions must be specified. This is another approach that can be used for the playback process to determine whether the video data file is being actively recorded. In this case, the key frame index should be written to disk because the shared memory will not be accessible across the two (or more) computers. Those skilled in the art will appreciate that it is possible to share memory across two or more computers to avoid such situations if desired.

Figure 5:
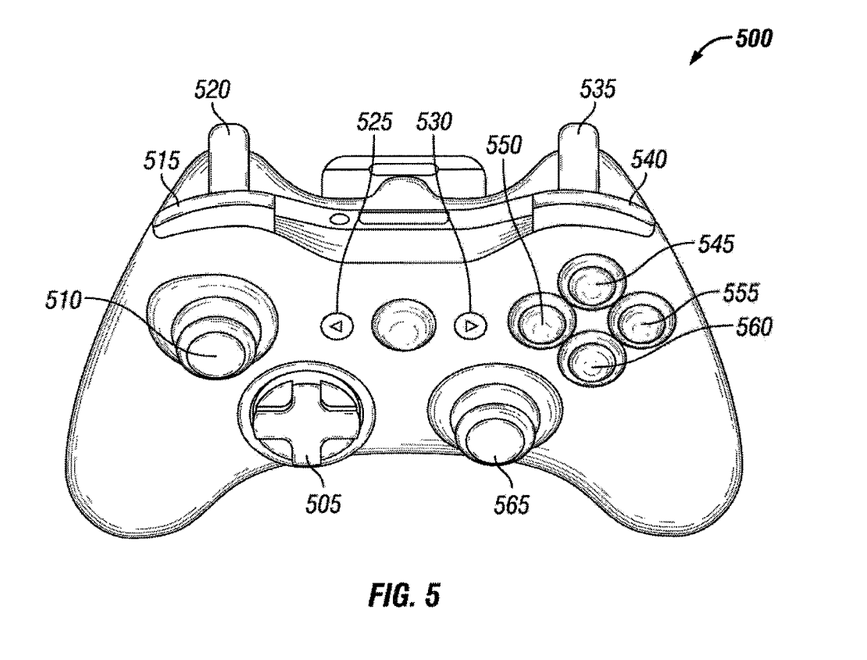
FIG. 5 is an illustration of a type of video playback controller in one embodiment.

Referring now to FIG. 5, an example of a controller 500 is shown. As noted above, controller 500 may be a type of conventional video game controller such as are commercially available from Microsoft Corporation for its Xbox video game systems. In one embodiment, and as shown in FIG. 5, computer software operating on a conventional type of computer is programmed so that the video displays 20, 25, and 30 shown in FIG. 1 respond to the controllers 21, 26, and 31, respectively, shown in FIG. 1. Each of the controllers 21, 26, and 31 may be used and may be the same as now explained with respect to controller 500. As shown in FIG. 5, the controller 500 includes a number of controls, including a directional pad 505, a left stick 510 which moves forward, backward, right and left (with respect to an operator's perspective and relative to an operator holding the controller 500 in front of him or her), a left bumper 515, a left trigger 520, a back button 525, a start button 530, a right trigger 535, a right bumper 540, a y button 545, an x button 550, a B button 555, an A button 560, and also a right stick 565, which is able to move forward, backwards, right and left as described with respect to left stick 510.

In one embodiment, the various controls on controller 500 can be used by an operator to control the display of video of an ongoing game and any video replays or playback as follows. An operator can use the left stick 510 to control the video playback mode, such as by displaying a video portion of an event in reverse mode by pushing the left stick 510 to the operator's left, displaying a video portion in forward mode by pushing the left stick 510 to the operator's right, jumping the video portion to be displayed to the next video tag by pushing the left stick 510 down, and jumping to the previous video portion that was tagged by pushing the left stick 510 up, all relative to the operator.

By pressing either or both the left bumper button 515 and/or the right bumper button 540, the operator can select the slow motion video playback mode. By pressing the left trigger 520, the operator can choose to have the video playback jump backwards 30 seconds, while by pressing the right trigger 535, the operator can choose to have the video playback jump forward 30 seconds. By pressing the start button 530, the operator can choose to have the video playback return to the previous video playback portion watched or, if there was none, to a live feed of the game, such as from the broadcast feed. The directional pad 505 can be used by an operator to navigate through a series of menu options shown on the video display (not shown in FIG. 5). The back button 525 can be used by the operator to return to the beginning of the video portion that is the subject of the video playback.

The operator can use the X button 550 to toggle between a full screen display and a smaller sized screen display. The B button 555 can be used to tag an event. By pressing the Y button 545, the operator obtains a display of a list of potential tags (not shown). As noted, the operator can use the directional pad 505 to navigate among the list of potential tags and then, but pressing the B button 555 when the desired tag is highlighted on the display, the operator tags the event with the desired tag. The operator can also use the start button 530 as follows. A single tap of the start button 530 will resume the video playback at the most recent point viewed by the operator, while a double tap of the start button 530 will resume the live display of the game, such as from a broadcast feed.

We have found that a system in accordance with one or more of the foregoing embodiments provides a number of advantages. One of the key advantages has been to reduce the time required between capture and playback from around 9 to 10 seconds or so to now as little as half a second or even less. Those skilled in the art will appreciate that the equipment used and its capabilities may affect such latency time periods, such as, for example, higher versus lower bit rates. For a system with a bit rate of about 10 megabits per second (10 Mbps), the system and methods described can almost entirely eliminate what would otherwise be a 9 or 10 second delay for video playback. In addition to reducing the time required for a video playback and the other advantages described above, the system provides yet additional advantages. The system provides a smooth video playback that is not choppy or relatively highly pixelated in appearance, especially with respect to video playback in reverse mode. In addition, the system allows an operator to quickly transition between forward and reverse motion playback modes;

in practice the system can often transition from forward to reverse playback modes, or vice versa, in as little as about 1/30 of a second or so. The use and handling of key frames by the system also allows operators to quickly locate and isolate discrete events, such as plays, and also allows for the ability of an operator to edit and add or delete various video captures of events, such as to quickly generate a file containing video of highlights from a drive, a quarter, or a game, or from a given player's performance, or the like. The system can be used with a variety of different audiovideo data formats and files. For example, the system described above can be used with files in different data formats such as those with different video compression formats, including as examples windows media video (wmv), Mpeg-2 (including .mov, .mp4, and .mpg files), H.264 (including .mov and .mp4). In addition, the system can be used to synchronize the video display at a plurality of video display units so that two or more users (such as officials) can watch the same video playback at the same time at locations remote from one another. Moreover, this system does not require additional hardware items, with attendant complexity and costs, but can use existing memory and disk storage available on conventional computers.

Those skilled in the art will further appreciate that the systems and methods described and disclosed herein can allow for multiple playback processes to access the same video data at the same time. For example, one playback process could be used for a video replay as described above while another process accesses the same video data at the same time for purposes of allowing a user to view and generate video clips, such as game highlights, summaries, or the like. Similarly, the video data can be accessed by one process for a video playback as described above while at the same time some or all of the same video data is accessed and played back by a separate process, such as for purposes of examining the video if an injury occurred or is suspected. This can be useful, for example, when a play is being reviewed by officials with a video playback when the play also resulted in an injury or suspected injury, such that a trainer or medical professional can review the relevant portion of the video data regarding the injury on a separate display while the official is reviewing the relevant portion of the video data for purposes of making an officiating call. In some situations, it can be expected that the relevant video data to be viewed by such different personnel may include both overlapping and differing video data.

As shown in FIG. 1 and described above, the system in one embodiment may have a plurality of video cameras 1-4 or the like which provide differing video inputs. In addition, the system in one embodiment may have a plurality of display units 20, 25, and 30, which may be the same type of device or may be different devices, including for example, personal computers, televisions, and the like. As noted above, those skilled in the art will appreciate that any number and any of a variety of different types of devices may be used. With respect to the displays 20, 25, and 30, the display format may also be varied, such that each of displays 20, 25, and 30 may show a different display (such as a display of a different video input from a different camera 1-4, for example).

Figure 6:
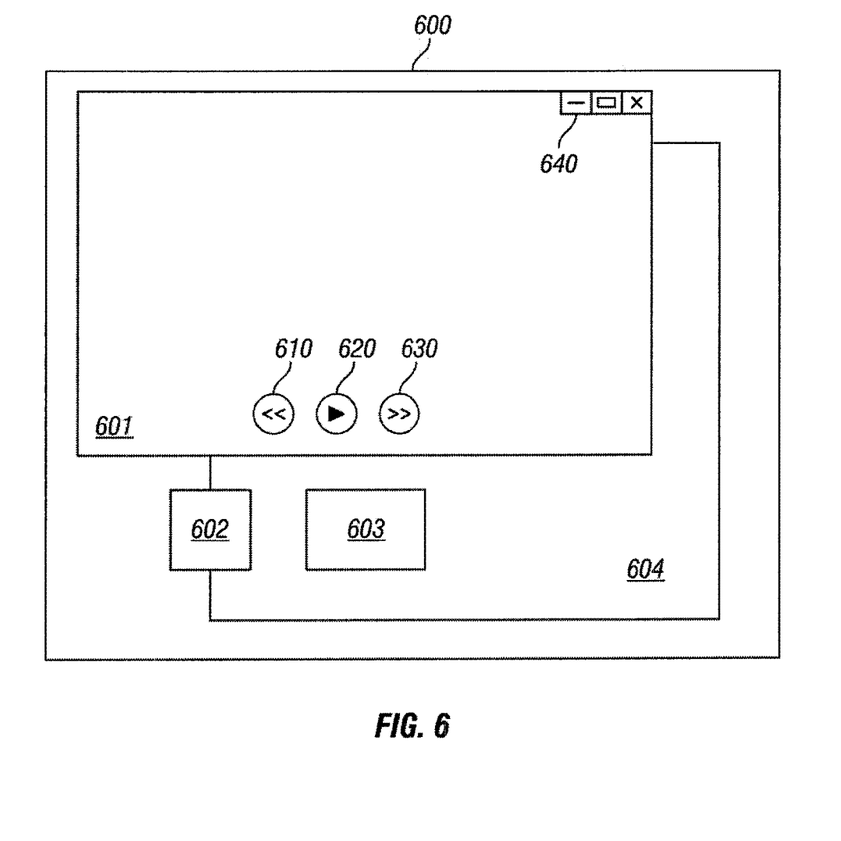
FIG. 6 is an illustration of a potential screen display for one or more video playbacks in one embodiment.

As illustrated in FIG. 6, each of the displays 20, 25, and 30 (shown in FIG. 1, but not in FIG. 6) may themselves provide displays of a variety of different video inputs. A display panel 600 is shown in FIG. 6, such as may be displayed on any of displays 20, 25, and/or 30 (not shown in FIG. 6), which further includes display panels 601, 602, 603, and 604. As shown in FIG. 6, the display panels 601-604 may have differing shapes and/or differing sizes. In addition, the display panels 601-604 may be superimposed on top of some or all of the other display panels. In one embodiment, an operator (such as a person watching the video displays) may alter or change the shape, size, and superimposition of the display panels 601-604 as desired, such as by entirely eliminating one or more display panels, or may move one or more of the display panels to different locations on display 600. In addition, some or all of the display panels 601-604 may further display icons, such as icons 610, 620, 630, and 640. In the embodiment shown in FIG. 6, for example, the icons 610, 620, 630, and 640 can be used by an operator to playback the video displayed in display panel 601 in reverse motion, initiate the play of the video feed on display panel 601 (if stopped or paused; if the video is playing, then icon 620 can be used for example, to pause or stop the video), and playback the video displayed in the display panel 601 in a fast-forward mode. Icon 640 can be used to minimize or maximize the size of the display panel 601, or to stop the software generating the display panel 601 from further executing and thus exit and remove display panel 601 from the display 600. This embodiment provides a number of advantages. If an operator chooses to watch in a "split-screen" or other mode of display, the operator can do so and can modify the size, shape, and relative treatment (e.g., superimposition of one display over another) as desired, and can adjust the various display panels as may be desired from time to time. By doing so, an operator can identify, for example, a particular camera angle or view in one video feed that seems likely to provide a clearer video replay of an event, and can quickly switch from providing one video feed display (e.g., from a video feed from a camera located in an endzone during a football game) to another (e.g., a video feed from a camera located on the sidelines near where an event occurred during a football game). Those skilled in the art will appreciate that the icons 610, 620, 630, and 640 may be accessed by an operator such as by using a conventional mouse or touchpad to click on an icon or by providing a touch screen display 600, so that the operator can touch the screen of the display 600 on the location of the desired icon.

Those skilled in the art will realize that the software used to generate the display of a video feed can in addition allow the operator the option to zoom in or zoom out, as may be desired. In one embodiment, the operator can zoom in on a specific portion of the video feed shown on a display while the playback is in motion (whether reverse, forward, slow, and/or fast modes). In addition, the software used to generate the display panels 601-604 can allow the operator to interrupt, pause or stop any ongoing video displays and switch to alternative video feeds, or to pause, zoom, reverse, forward or the like an ongoing video feed in some or all of the display panels 601-604 at the same time or, for example, to show a video playback in reverse slow-motion on panel 601 while at the same time showing a live feed on panel 602. This system is thus quite flexible and allows an operator to adjust and modify the display shown on display 600 in a wide variety of ways.

The foregoing detailed description and disclosure is only illustrative and by way of examples. Those skilled in the art will appreciate that the foregoing embodiments can be changed and arranged in different ways, and can be implemented in a variety of different ways, all without going beyond the scope and spirit of the invention which is set forth in the claims below. For example, it is possible to not divide the memory buffer into separate blocks. However, it is believed that this approach would likely mean updating the first available data address and available data count more frequently and thereby likely requiring the shared variables to be locked more often. Those skilled in the art will appreciate as well that a variety of different video and audiovisual file formats may be provided as inputs. In many situations, a number of cameras will be used to capture and record a single sporting event, and the video provided by the cameras can be captured and stored as described above. Those skilled in the art will also appreciate that various types of components, such as for example, controllers, computer servers, operating systems, and video displays, may be used as may be desired.

Moreover, while the disclosure has used a sporting event as an example, those skilled in the art will appreciate that the systems and methods described herein will find useful application in a variety of fields in which a video playback of an event may be useful. For example, the present disclosure may be useful in connection with other events, such as concerts, rallies, speeches, pageants, and the like, and in connection with fields such as television and movie production and filming. In addition, a quick video playback of an event may be helpful to security personnel or police.

In addition, the foregoing disclosure and description has focused primarily on video or audio visual data as the data input from an event. Those skilled in the art will also appreciate, however, that during many events there are also a number of other types of data that can be captured and recorded. For example, and staying with the example of a professional sporting event, onfield biometric data from a variety of players and/or coaches and/or officials may be captured and stored, as well as a variety of information that may be obtained from onfield sensors. Similarly, data can be captured and stored as to the GPS (global positioning system) location of players, coaches, and/or officials during a game, as well as the location of the ball or other equipment or items used in the game, at the event location, or otherwise of relevant interest, during (and before and/or after the game). For example, by capturing and storing such information during a given play in an NFL game, a running back's acceleration, path, velocity, and force of impact upon being tackled may be captured and recorded. Such information may prove useful when combined with other information, such as the time of the play during the game (e.g., the first minute of the fourth quarter), the nature of the play (e.g., a slant), the nature of the defense of the given play (e.g., a blitz with five rushers), the results of the play (e.g., a gain of five yards), and the like.

We claim:

1. A system for providing a video playback of an event, comprising:
    a computer having a processor, the processor operable to receive a plurality of video data inputs, and the computer further comprising a non-volatile storage and a memory buffer, wherein at least a portion of the memory buffer has been allocated for storing video data of the video data inputs and information related to the video data, and wherein at least a restricted portion of the memory buffer is restricted so that the restricted portion cannot be the subject of both a read operation and a write operation at the same time;
    software operable on the computer to receive the video data inputs and generate a key frame index and store at least a portion of the video data and at least a portion of the key frame index in data blocks in the memory buffer;
    software operable on the computer to store at least a portion of the video data and at least a portion of the key frame index in the non-volatile storage; and
    software operable on the computer and responsive to a command from a user to generate a playback of at least a portion of the video data in a reverse mode.

2. The system according to claim 1 further comprising software operable to check the key frame index and, in response, determine whether the portion of the video data responsive to the command from a user is stored in the non-volatile storage or the memory buffer and to read the video data from either the non-volatile storage or the memory buffer.

3. The system according to claim 1 further comprising: at least one controller and at least one video display.

4. The system according to claim 1 further comprising software operable to generate a display of the playback of the portion of the video data in a slow motion mode.

5. The system according to claim 4 further comprising software operable to generate a display of the playback of the portion of the video data in a fast mode.

6. The system according to claim 4 further comprising software operable to generate a display of the playback of the portion of the video data in a forward mode.

7. The system according to claim 4 wherein the portion of the memory buffer allocated for storing video data comprises between 5 megabytes and 75 megabytes of random access memory.

8. The system according to claim 6 wherein the portion of the memory buffer allocated for storing video data comprises between 30 megabytes and 50 megabytes of random access memory.

9. A method of providing a video replay of an event comprising the steps of:
    allocating a portion of volatile memory of a computer system for storage of at least a portion of an index of key frames of a video file or a video file;
    restricting access to at least a portion of the portion of volatile memory allocated for storage of at least a portion of the index of key frames or video file;
    storing a video file of an event in the volatile memory;
    generating the index of at least a plurality of key frames of the video file;
    storing the index of key frames in the volatile memory;
    responsive to a user command, reading at least a portion of the index of key frames or at least a portion of the video file from the volatile memory.

10. The method according to claim 9 wherein the volatile memory is a buffer.

11. The method according to claim 10 wherein the buffer comprises a portion of random access memory in the computer system.

12. The method according to claim 9 further comprising the step of storing the index of key frames and the video file in a non-volatile memory.

13. The method according to claim 9 further comprising the step of providing a controller operable to select a mode of displaying the video file and to control the mode.

14. The method according to claim 13 wherein the controller is operable to allow an operator to display the video file in a reverse mode.

15. The method according to claim 14 wherein the controller is operable to allow an operator to display the video file in a fast-forward mode.

16. The method according to claim 15 wherein the controller is operable to allow an operator to display the video file in a slow-motion mode.

17. The method according to claim 9 further comprising the steps of:

storing a portion of the video file in a non-volatile memory;

responsive to an operator command, if a portion of the video file to be read in response to the command is stored in the non-volatile memory, reading the portion of the video file stored in the non-volatile memory; and displaying the portion of the video file stored in the non-volatile memory.

18. A computer system for providing a video playback of an event, comprising:

a computer having a processor, the processor operable to receive a plurality of video data inputs and connected to a non-volatile storage and a memory, wherein at least a first portion of the memory has been allocated for storing video data of the video data inputs, and wherein at least a second portion of the first portion of memory allocated for storage of the video data is restricted so that the second portion cannot be the subject of both a read operation and a write operation at the same time;

software operable on the computer to receive the video data and generate a key frame index and store the video data and the key frame index in data blocks in the memory;

software operable on the computer to store the video data and the key frame index in the non-volatile storage;

software operable on the computer and responsive to a command from an operator to generate a playback of at least a portion of the video data for an event; and software operable to generate a display of the playback of the portion of the video data in a manner responsive to a mode selected by an operator using a controller.

19. The system according to claim 18 wherein the memory comprises a buffer.

20. The system according to claim 19 wherein the buffer comprises a portion of random access memory in a computer system.

21. The system according to claim 18, wherein the video data comprises the key frame index and a corresponding video file.

22. The system according to claim 18, further comprising a plurality of video displays and a corresponding plurality of controllers, wherein each of the controllers is operable to control the mode of a video shown on the corresponding video display.

23. The system according to claim 18, further comprising software operable on the computer to check the key frame index in response to an operator command and determine whether the portion of the video data responsive to the operator command is stored in the non-volatile storage or the memory and, in response to the check, to read the video data from either the non-volatile store or from the memory.

* * * * *